United States Patent [19]
Gauthier et al.

[11] Patent Number: 6,061,353
[45] Date of Patent: May 9, 2000

[54] COMMUNICATION SYSTEM FORMED BY ATM NETWORK AND MULTIPLEXING DEVICE SUITABLE FOR SUCH A SYSTEM

[76] Inventors: Jean-Pierre Gauthier, 7, allée du Josas, Jouy en Josas; Georges Tibi, 13, rue Paul Langevin, 92260 - Fontenay aux Roses, both of France

[21] Appl. No.: 08/778,228

[22] Filed: Jan. 8, 1997

[30] Foreign Application Priority Data

Jan. 10, 1996 [FR] France ................................. 96 00214

[51] Int. Cl.$^7$ .............................. H04Q 11/04; H04J 3/16
[52] U.S. Cl. .......................... 370/395; 370/412; 370/420; 370/463
[58] Field of Search ..................... 370/230, 395, 370/396, 397, 400, 409, 412, 420, 463, 537, 235, 386

[56] References Cited

U.S. PATENT DOCUMENTS

| | | | |
|---|---|---|---|
| 5,625,846 | 4/1997 | Kobayakawa et al. | 370/412 |
| 5,633,870 | 5/1997 | Gaytan et al. | 370/412 |
| 5,684,798 | 11/1997 | Gauthier | 370/395 |
| 5,757,797 | 5/1998 | Gauthier | 370/420 |

FOREIGN PATENT DOCUMENTS

| | | | |
|---|---|---|---|
| 0632669A1 | 1/1995 | European Pat. Off. | H04Q 11/04 |
| 0689371A1 | 12/1995 | European Pat. Off. | H04Q 11/04 |
| 9512582 | 10/1995 | France . | |

OTHER PUBLICATIONS

"Asynchroous Transfer Mode" by Martin de Prycker, 1991, Ellis Horwood Editions, Great Britain.

*Primary Examiner*—Chi H. Pham
*Assistant Examiner*—Ricky Q. Ngo
*Attorney, Agent, or Firm*—Venable; James R. Burdett; Clint A. Gerdine

[57] ABSTRACT

A communication system is formed by an ATM network and a multiplexing device suitable for such a system. The ATM network includes a plurality of nodes and links which connect various access points within the network. The multiplexing device includes a plurality of access terminals which transmit information across the network to output terminals linked to the access points via demultiplexing devices. Information transmitted across the network is routed using cells containing a destination identifier which defines the connection between two of the access points and the multiplexing device.

1 Claim, 8 Drawing Sheets

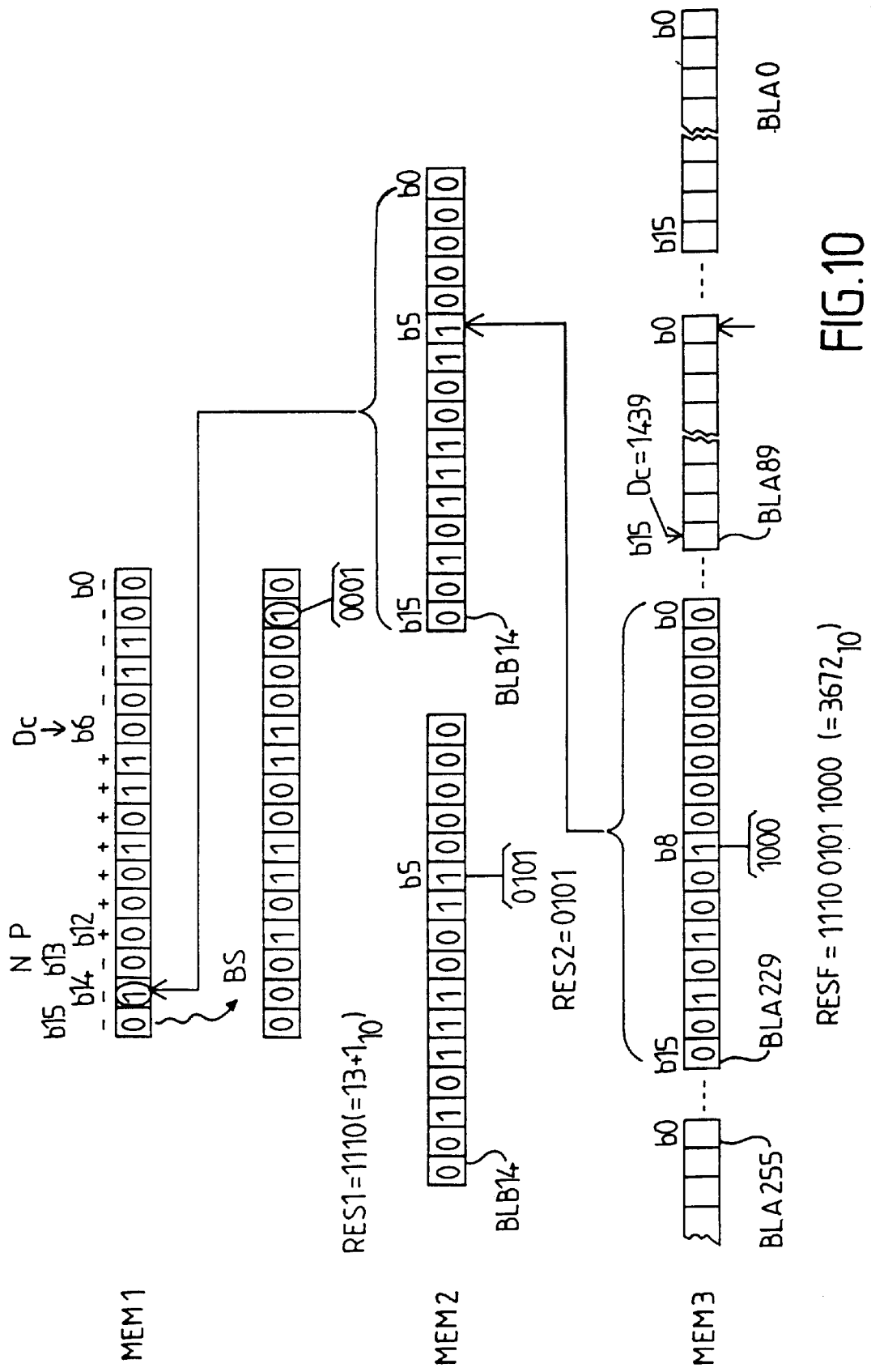

COMMUNICATION SYSTEM FORMED BY ATM NETWORK AND MULTIPLEXING DEVICE SUITABLE FOR SUCH A SYSTEM

FIELD OF THE INVENTION

The present invention relates to a communication system formed at least by an ATM network which notably transmits from one of its access points to another, information cells which contain a destination identifier which defines connections between two of said access points and at least a multiplexing device comprising:

- a plurality of access terminals for users who have cells to be transmitted at a certain rate via a certain connection,
- at least a connecting terminal for at least an access point of said network,
- a plurality of service circuits assigned to the access terminals, formed by:
- buffer elements for storing the user cells for a connection,
- a cell transmission control for rendering the stored cells available on cell outputs,
- an allocation circuit for determining the supply of at least one cell to said connecting terminal.

The present invention also relates to a multiplexing device suitable for such a system.

BACKGROUND OF THE INVENTION

Such a system is described in the Patent filed in France by the Applicants under no. 95 12 582 on Oct. 25, 1995.

This known system comprises an allocation circuit in which connection identifiers are supplied in packets. For spreading the packets, an allocation circuit is used, so that one cell per cell period is transmitted.

The present invention proposes a system of the type defined in the opening paragraph, which comprises a particularly high-performance allocation circuit.

SUMMARY OF THE INVENTION

Therefore, such a system is characterized in that the allocation circuit furthermore comprises:

- means for establishing stop dates for each cell to be transmitted which cell is defined by a connection identifier based on said requirements,
- a table for storing possibly stringed connection identifiers which depend on an address spacing which is a function of stop dates,
- a tree device whose number of leaves corresponds to the address spacing of said table for storing an activation element which determines the presence of the identifier for the whole address spacing of said table,
- an insertion circuit for inserting a connection identifier,
- a searching circuit for producing the address of the connection identifier(s) by operating the tree device.

These and other aspects of the invention are apparent from and will be elucidated with reference to the embodiments described hereinafter.

BRIEF DESCRIPTION OF THE DRAWINGS

In the drawings:

FIG. 10 is a diagram in explanation of the operation of the tree device.

DESCRIPTION OF PREFERRED EMBODIMENTS

Figure 1:
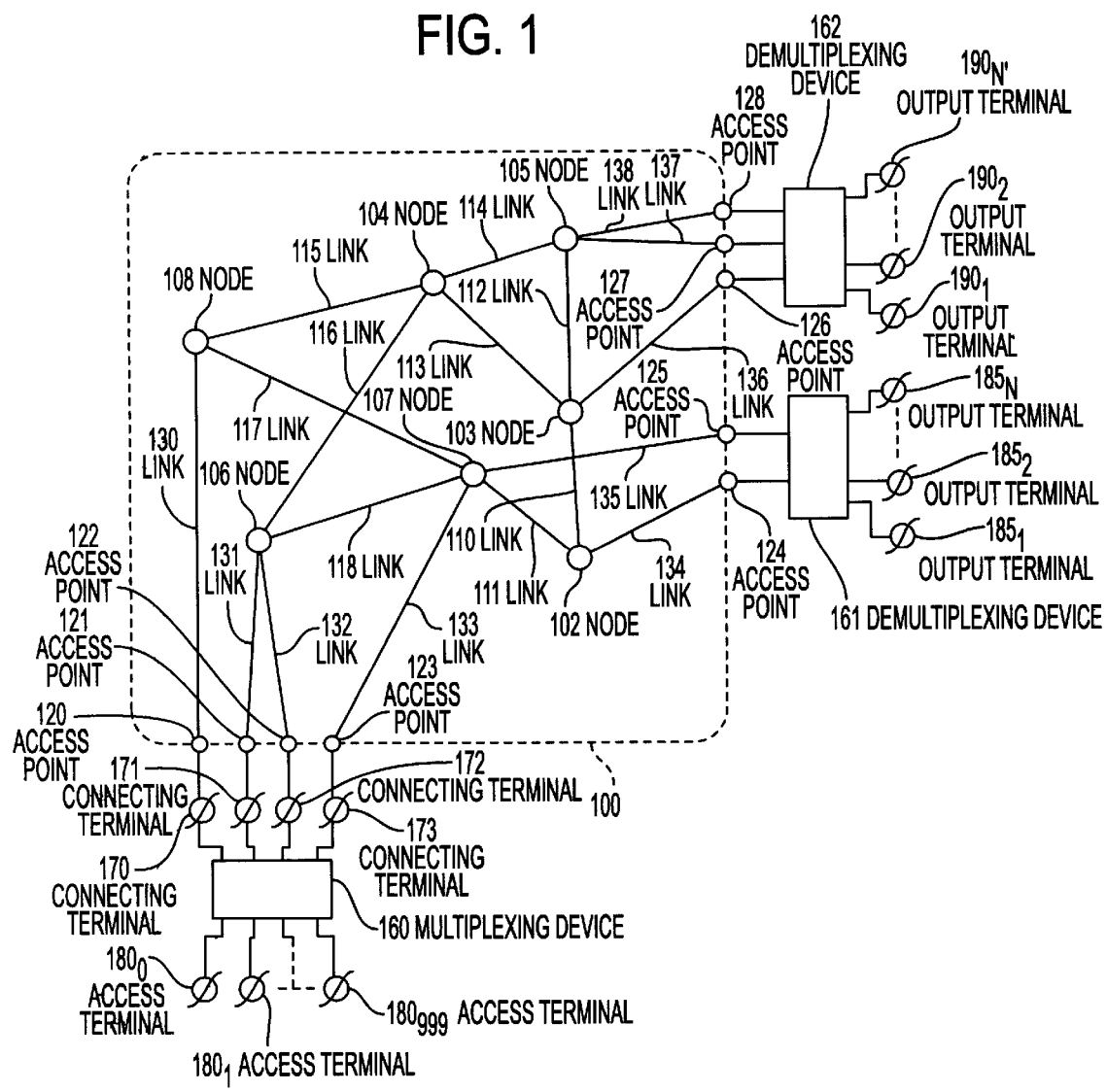
FIG. 1 shows a network to which a multiplexing device according to the invention is connected.
Figure 2:
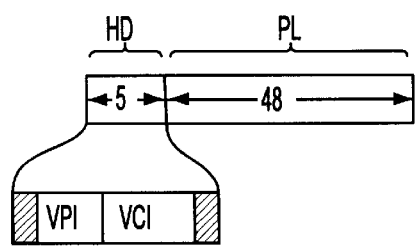
FIG. 2 shows the structure of the information cells transmitted over the network.

FIG. 1 shows in a diagrammatic manner an ATM network which is referenced 100 in the Figure. A description of this network will be found in the publication: "ASYNCHRONOUS TRANSFER MODE" by Martin de PRYCKER, published in 1991 in the ELLIS HORWOOD Editions, Great Britain. This network is formed by various nodes 102, 103, 104, 105, 106, 107 and 108 interconnected by links 110 to 118 for connecting respectively, the nodes 102–103, 102–107, 103–105, 103–104, 104–105, 104–108, 104–106, 107–108, and 106–107. Various access points to this network are referenced 120 to 128. These access points are connected respectively, to the nodes 108, 106, 106, 107, 102, 107, 103, 105 and 105 via the respective links 130 to 138. Various multiplexing and demultiplexing devices 160, 161 and 162 are connected to these access points. Among these devices there should be distinguished: a multiplexing device 160 which forms part of the present invention, and two demultiplexing devices 161 and 162 which perform reverse operations to those of device 160 and which form part of the system of the invention. In European Patent Specification EP 0 632 669, filed Jun. 23, 1994, a description will be found of such demultiplexing devices. To be connected to the four points 120, 121, 122, 123, the multiplexing device 160 has four connecting terminals 170, 171, 172 and 173. Thus, within the framework of this described example, the information can go from device 160 to the devices 161 and 162 by passing through the network 100. This transmit information is applied to a plurality of access terminals $180_0$ to $180_{999}$ which the multiplexing device 160 has and can, for example, be produced on output terminals $185_1$ to $185_N$ of the device 161 and $190_1$ to $190_{N'}$ of the device 162. The order of magnitude of N and N' is one thousand. The information transmitted through the network is produced in the form of cells whose structure is shown in FIG. 2. These cells are formed by 53 octets: 5 of which forming the header field HD and the 48 remaining octets referenced PL containing the data for a transmission service. In the header field, two codes VPI and VCI are distinguished which correspond to virtual path identifier and virtual circuit identifier, respectively. The virtual path identifiers are processed by the transmission operator and the virtual circuit identifier by the network provider.

Figure 3:
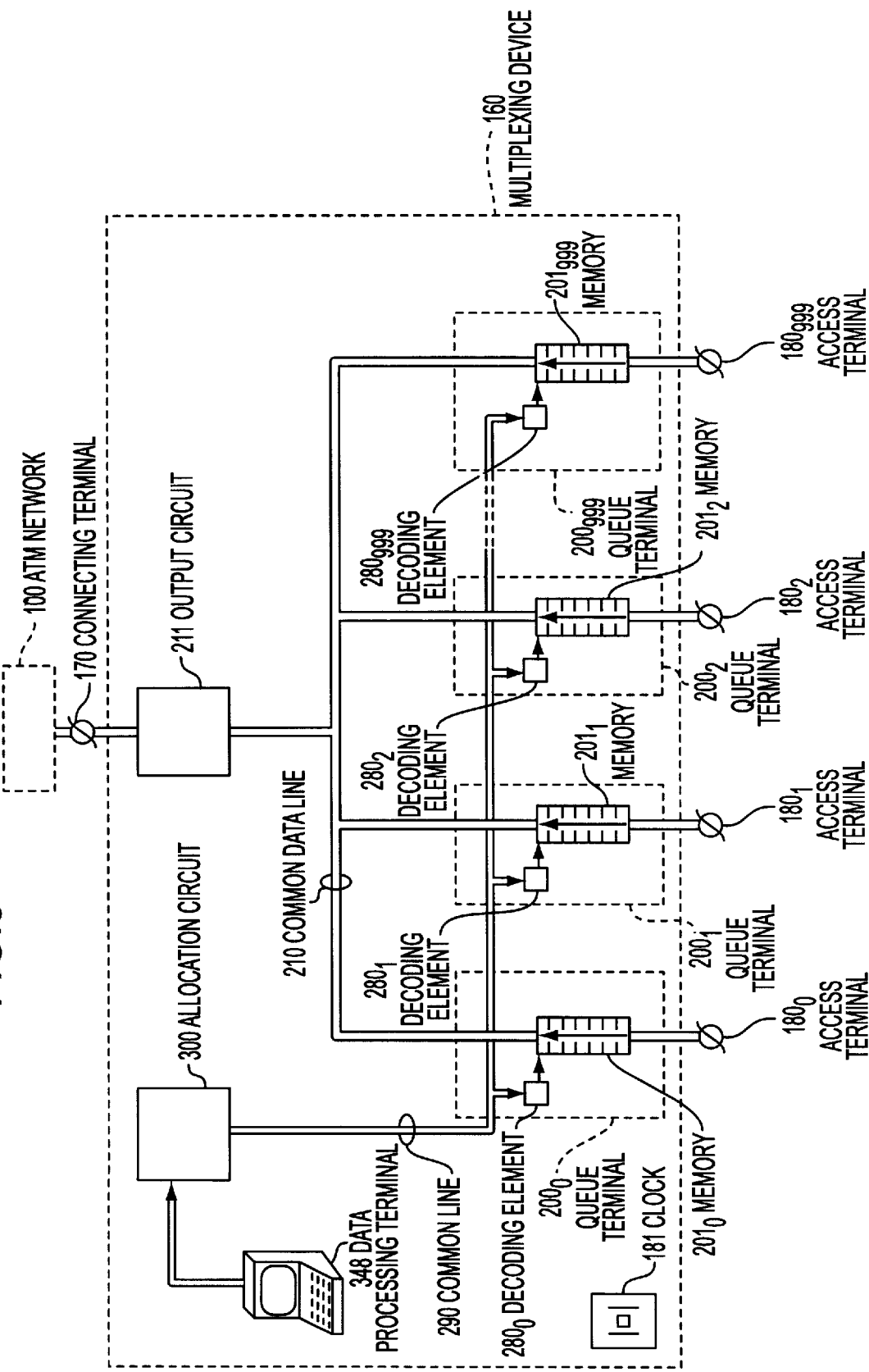
FIG. 3 shows a multiplexing device according to the invention.

FIG. 3 shows a diagram of the multiplexing device 160. To simplify the exposition, attention is only paid in this drawing Figure to the cells to be supplied to the single terminal 170 and which are based on information coming from access terminals $180_0$ to $180_{999}$ with a cell period timing defined by a period Tc of signals produced by a mother clock 181.

Each of these terminals $180_0$ to $180_{999}$ receives cells that have the same identifier and the same traffic constraints. The index i ($0 \leq i \leq 999$) determines the index of the accesses $180_0$ to $180_{999}$. The cells are stored in queue elements $200_0$ to $200_{999}$, respectively. These various elements $200_0$ to $200_{999}$ are formed by memories of the FIFO type $201_0$ to $201_{999}$, respectively. These memories return on their output the data in the order in which the data have come in. A recognition code "i" to be identified by said index is assigned to each of these elements $200_0$ to $200_{999}$. A common data line 210 connects the output of the queue elements to the terminal 170, via an output circuit 211 which is a simple circuit for adapting signals on this terminal 170.

The queue elements $200_0$ to $200_{999}$ also comprise elements for authorizing the sending which have occurred in the form of a decoding element $280_0$ to $280_{999}$. The inputs of these decoding elements are connected to a third common line 290 which interconnects all the queue elements $200_0$ to $200_{999}$. The recognition code, also called connection identifier "i" ($0 \leq i \leq 999$), can be detected in each of these elements $200_0$ to $200_{999}$. The succession of the same connection identifier on the line 290 thus defines a transmission channel and its occurrence, the capacity or the bandwidth of this channel.

An allocation circuit 300 produces the recognition code over this last line 290 to authorize the queue element indicated by this code, to transmit a cell called chosen cell. No more than one cell can be transmitted per cell period. The allocation circuit 300 is managed by a management element shown in the form of a data processing terminal 348.

Figure 4:
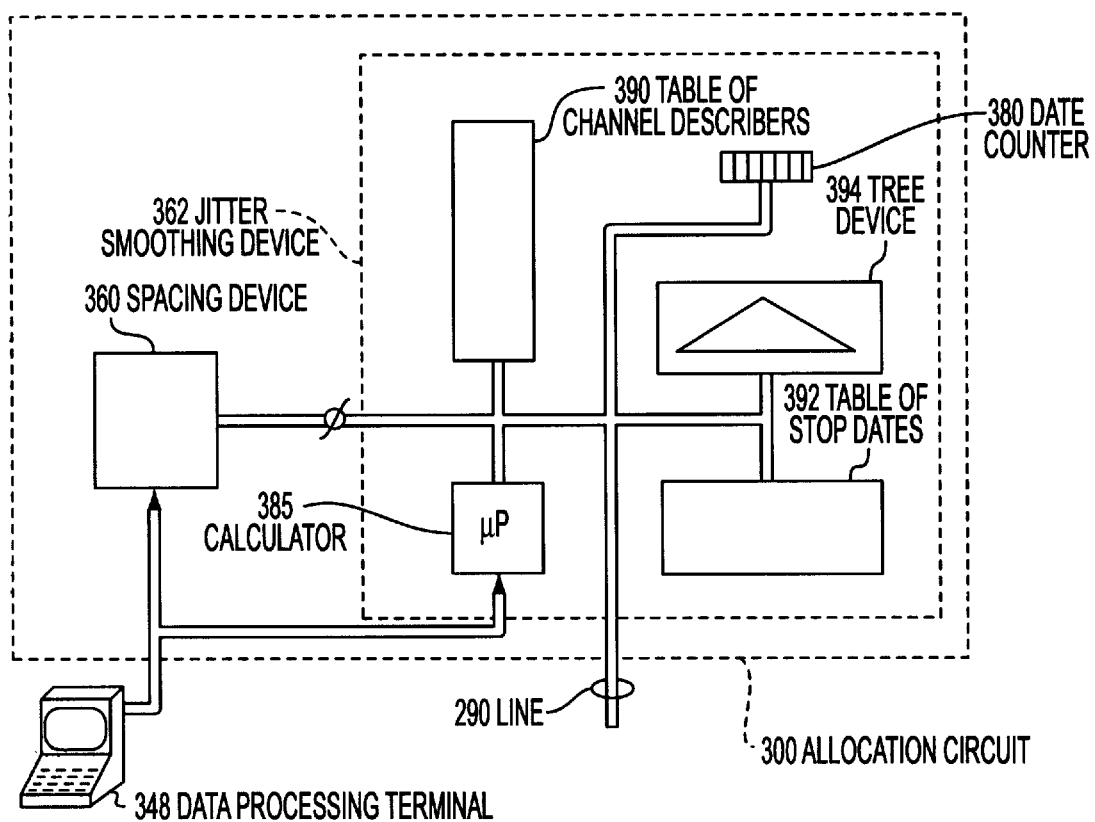
FIG. 4 shows the structure of an allocation circuit which forms part of the device shown in FIG. 3.

FIG. 4 shows the structure of the circuit 300. This is formed by a spacing device 360 whose structure may be that described in Patent Application 95 12 582 mentioned above, and by a jitter smoothing device 362. As indicated in this Patent Application, the device 360 can produce a certain number of cell identifiers which can selected per cell period. The smoothing device 362 produces the cell identifier which is chosen for a cell period. This device 362 implies the presence of a date counter 380 which continuously gives a current modulo-N date. Let us assume N=4096. The date counter counts in timing with the cell period Tc. A calculator 385 ensures the management of this smoothing device 362 which further includes a table of channel describers 390 indexed with the number of the channel, a table of stop dates 392 and, according to an important aspect of the invention, a tree device 394. These various elements will be clarified more in the present disclosure.

Figure 5:
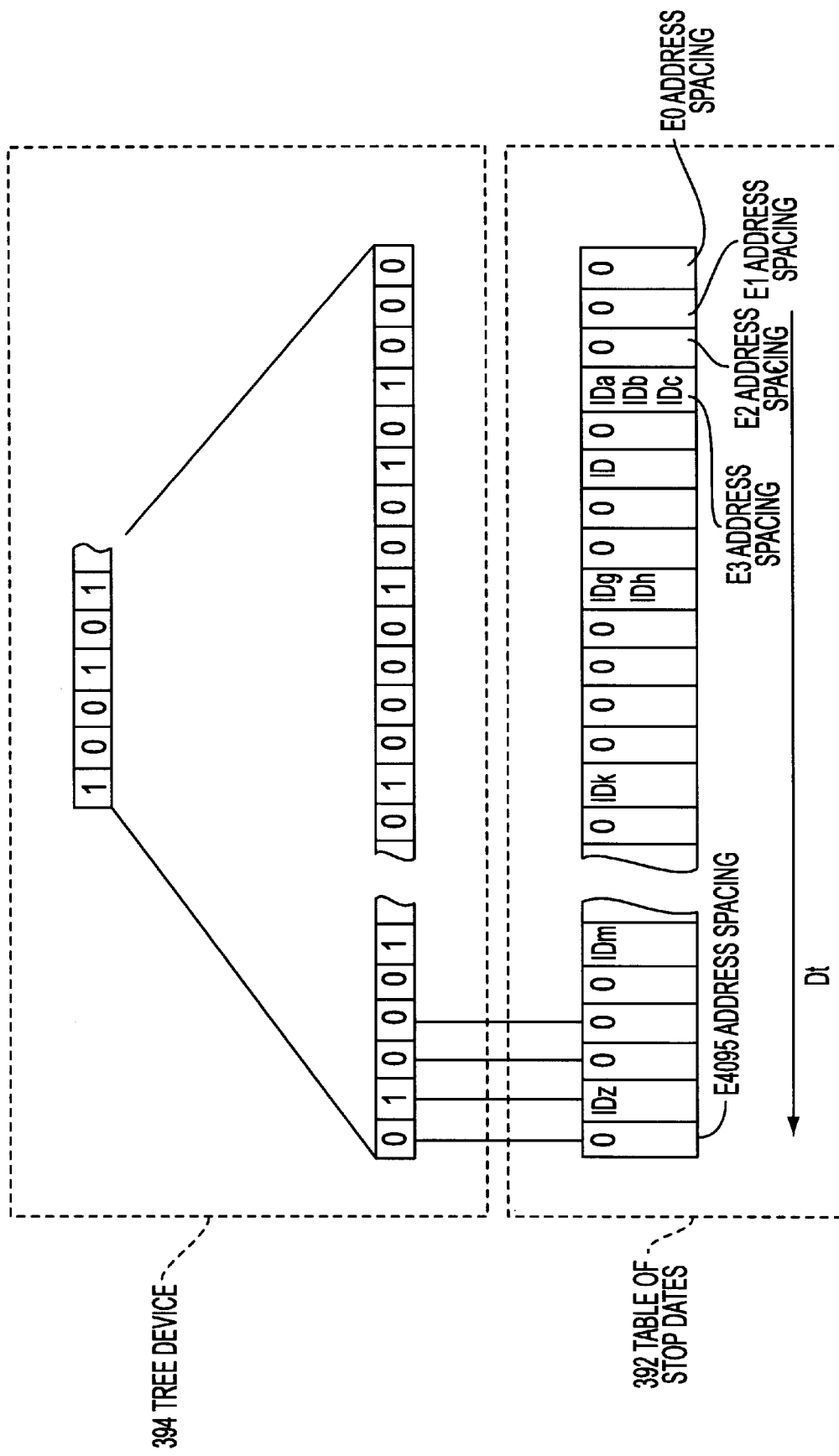
FIG. 5 shows the relations between a tree device and a stop-date table which forms part of the device shown in FIG. 3.

FIG. 5 shows the relations, established by the measures according to the invention, between the tree device 394 and the stop-date table 392. The stop-date table has an address spacing (E0 to E4095) which corresponds to the capacity of the date counter 380. Each location of this table can be compared to a date. It will be noted that the dates run from right to left as indicated by the arrow. In each of these locations, one or various connection identifiers are found, for example, 3 identifiers IDa, IDb and IDc which are thus linked are found in the location referenced E3 in FIG. 5. Each element of the table is addressed in a cell period Tc. The presence of an ID in an element of this table does not mean that this ID becomes eligible for the date defined by the element containing the ID (minimum selection date), but that it has to be selected in the worst case at this date (maximum selection date). The present invention proposes a particularly effective search for an element in this table. In this context the example will be discussed of a table which permits the management of channels which have a minimum rate of 1/2048 of the maximum rate shown by one cell for each period Tc and stop periods which are systematically equal to the intercell spacing. If the sum of the rates is lower than the total rate, a channel can theoretically be selected at its stop date or after its stop date. Nevertheless, for security reasons, 50% of the entries of the table are used for future dates and the rest for past dates, the size of the table is 4096 entries, that is: $2^{12}$.

The tree of the tree device 394 permits of a fast search to find the channel that has the smallest date in the stop-date table 392. To each element of this table is associated at the lower part of the tree a bit, for example, a bit of the "1" value which represents the occupation of the element of the table (occupied/free). To its higher level is associated a bit of a group of bits of a lower level. This bit marks the occupation of one or various bits of its group of the lower level.

Figure 6:
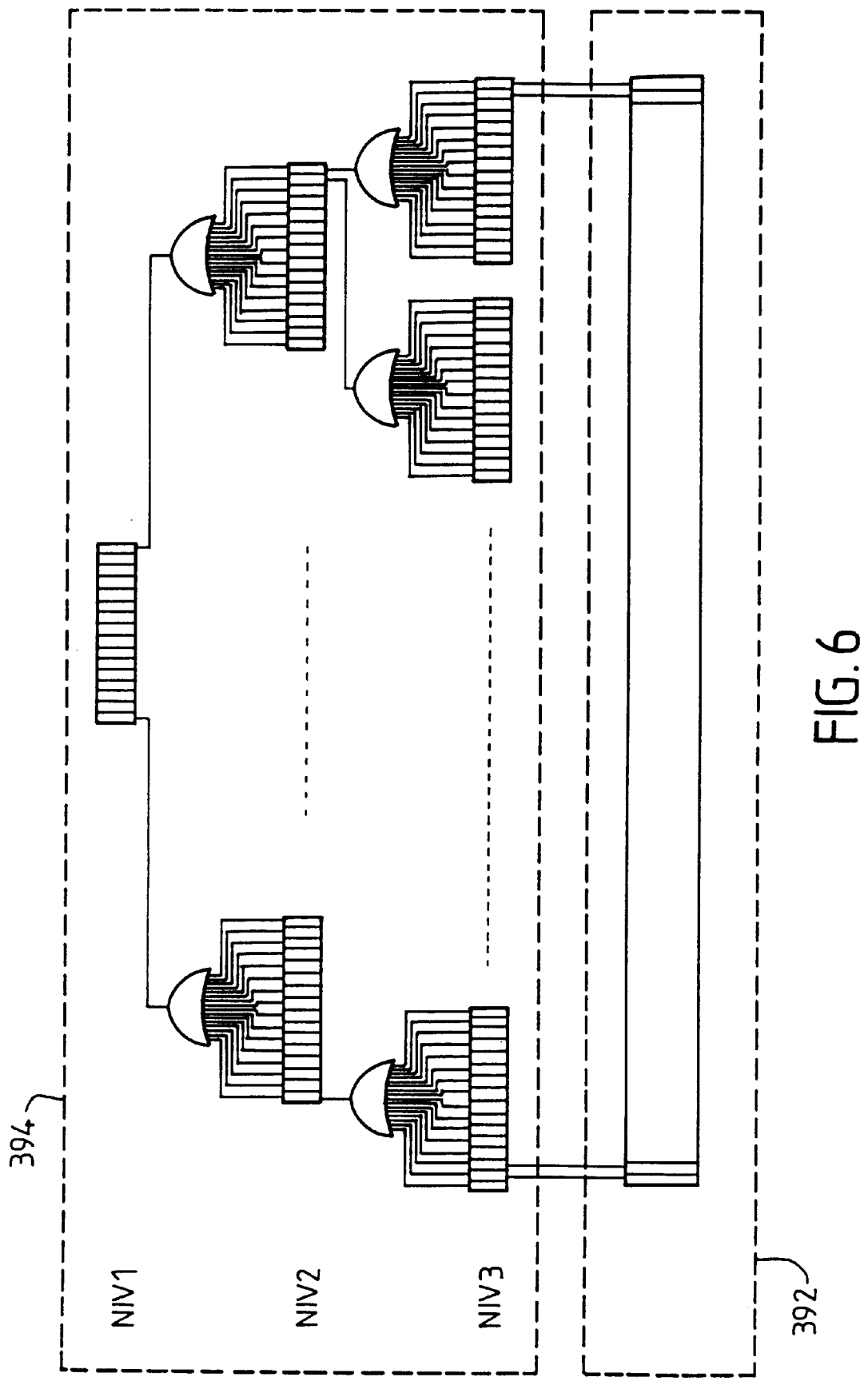
FIG. 6 shows how the tree device is organized as a function of the presence of a connection identifier.

The operation is simply the logical OR operation as shown in FIG. 6. Thus, 3 levels NIV1, NIV2 and NIV3 are overwritten. Within the scope of the described example, the level NIV3 comprises 256 registers to be made into groups of 16 bits, the level NIV2 comprises 16 registers of 16 bits and the level NIV1, which is the root, comprises only a single one of these registers. It will be obvious, without leaving the scope of the invention, that groups of different values are used and that the number of bits associated to a group is not, of necessity, identical at each level.

In the case shown in FIG. 6, "logical OR" operations are carried out with all the registers of the levels NIV3 and NIV2, so that each position of a register is loaded via the logical OR of 16 other registers of a lower level.

DESCRIPTION OF THE TREE DEVICE 394

Figure 7:
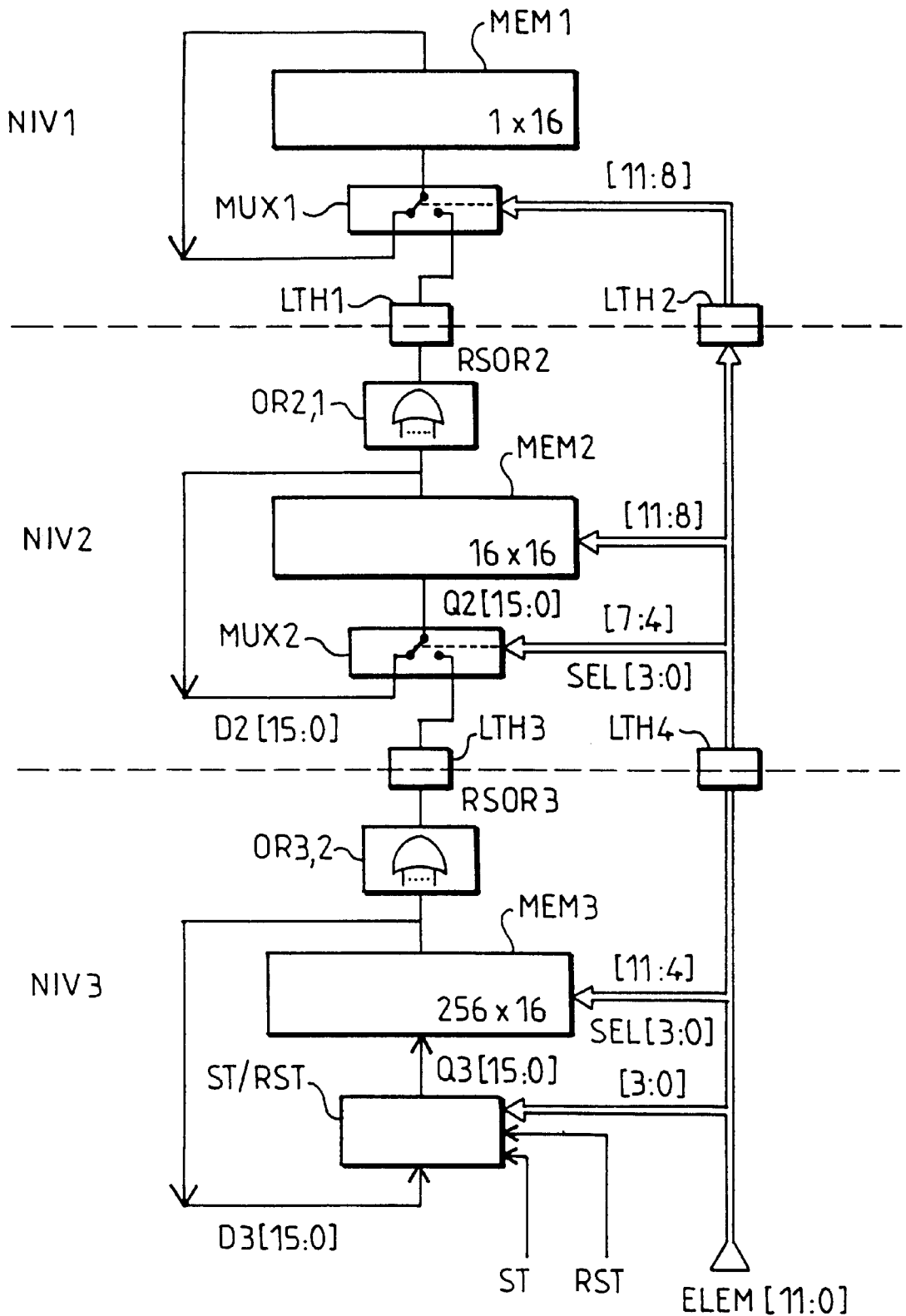
FIG. 7 shows the structure of the tree device with respect to an insertion.
Figure 9:
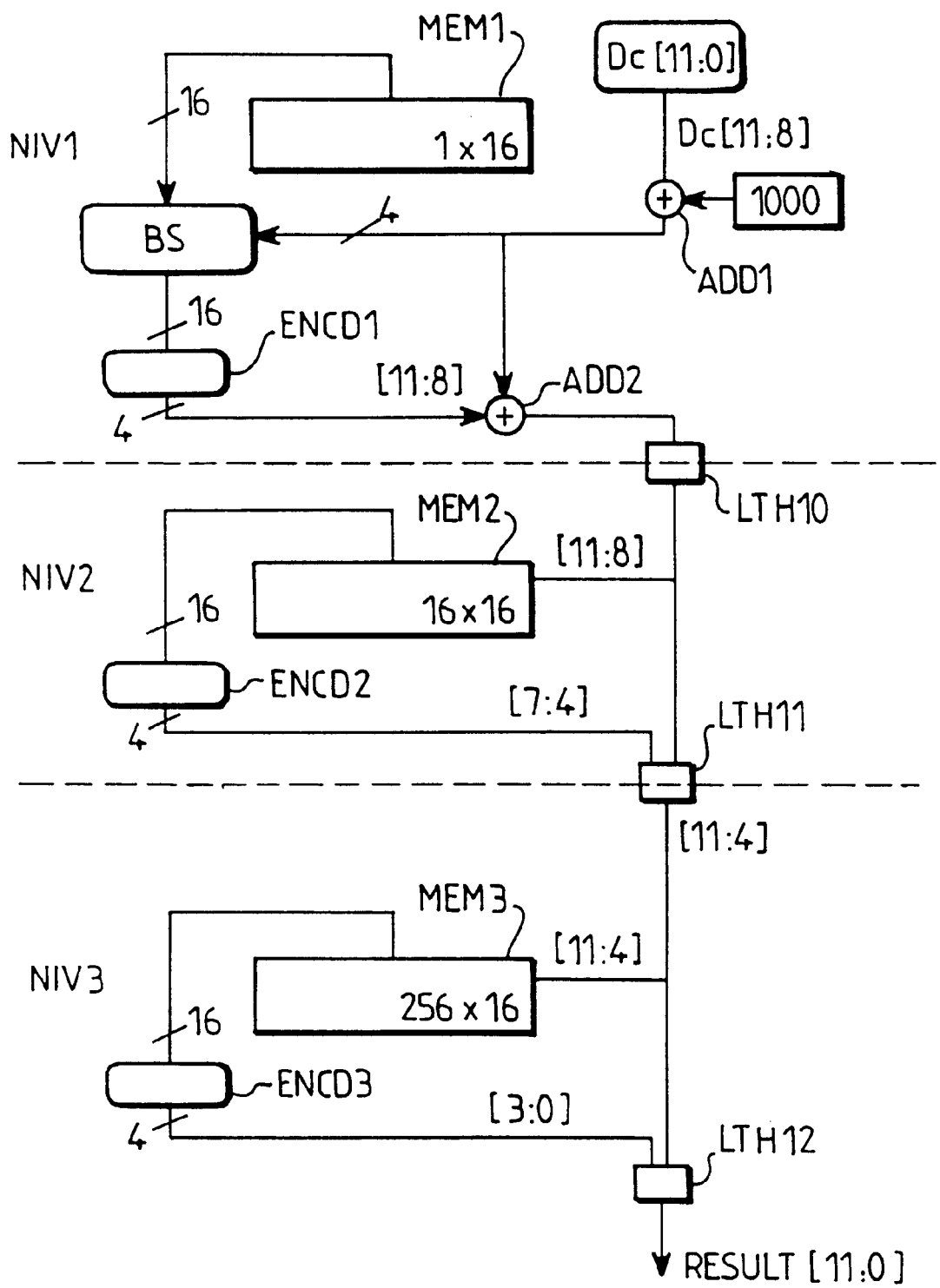
FIG. 9 shows the structure of the tree device with respect to a search.

Since the tree is subjected to two types of operations, this device has been broken down into two separate arrangements for clarity: one arrangement for insertion and another one for searching operations. Certainly, in practice they are superimposed and require the introduction of a multiplexer for the address of the memories, set as a function of the current "phase". FIGS. 7 and 9 show the respective arrangements for insertion and searching operations.

It is to be noted that it is possible to make various insertions per cell period. On the other hand, only a single searching operation is carried out per cell period. Insertions and a search may be carried out simultaneously. The access to the memory comprises "4 phases": three are dedicated to the insertion and one is reserved for the search.

Insertion arrangement (FIG. 7)

The arrangement is formed around three memories MEM1, MEM2 and MEM3 respectively, assigned to said levels NIV1, NIV2, and NIV3. These memories are arranged in words of 16 bits which correspond to said groups. The memory MEM1 comprises only one word, memory MEM2 sixteen and memory MEM3 two hundred and fifty six. The first operation in the insertion process consists of activating or deactivating a bit in the memory MEM3 of the level NIV3 and updating the bits which relate to the groups to which they belong, in the memories of levels NIV2 and NIV1.

During an insertion, the bit number ELEM defined by 12 bits, which is indicated by [11:0] in the Figure, and also the type of insertion (Activation: ST, Deactivation: RST) are shown at the lower part of the tree. The insertion syntax is as follows:

Ins (element, set, reset)
where set and reset are Boolean values, the absence of these two means that neither operation is carried out.
Sequentially:

The 8 most significant bits [11:4] of ELEM are sent to the memory MEM3, the addressed word (called D3[15:0]) is read and sent to the block ST/RST which also receives the 4 least significant bits [3:0] of ELEM as well as the Boolean set, reset values. The least significant bits of the interlevel links are also represented by SEL[3:0]. On the output, the block ST/RST sets the bit designated SEL[3:0] in the read word of the memory to active (set=TRUE) or inactive (reset=TRUE). The resulting word (called Q[15:0]) is then written in the memory.

The structure of this block ST/RST is derived from the following logical equation:
This equation relates to each bit 'n' (0=<N=<15):
Qn=((set==TRUE) AND(n==SEL[3:0]))
OR(Dn AND/NOT((reset==TRUE)AND(n==SEL[3:0]))).

The same resulting word is read once again and a logical OR operation is carried out by a block OR3,2 between all the bits. The result RSOR3 is applied to a higher level stage NIV2.

At level 2 (NIV2), the field [11:8] of ELEM is sent to the memory MEM2 to address one of the sixteen words of sixteen bits. The addressed word (called D2[15:0] is read and sent to a block MUX2, which also receives the 4 intermediate-order bits [7:4] of the "element" (called SEL [3:0] because they are the least significant elements of the link at level NIV2), and also the result of the preceding stage RSOR3. On the output, the block MUX2 sets the bit designated SEL[3:0] in the word read from the memory to active (RSOR3=TRUE) or inactive (RSOR3=FALSE). The resulting word (called Q2[15:0]) is then written in the memory. The structure of the block MUX2 is derived from the following logical equation:

The equation with respect to a bit 'n' (0=<n=<15) is the following:
Qn=((resOR==true) AND (n==SEL[3:0]))
OR (Dn AND/NOT((ResOR==FALSE) AND (n==SEL [3:0]))).

The same resulting word is read once again and a logical OR operation is carried out between all the bits by block OR2,1. The result RSOR2 is applied to the higher-level stage NIV1.

The level NIV1 undergoes a process which is identical with level NIV2.

Various registers LTH1 to LTH4 inserted between the levels allow of a pipeline operation.
Search arrangement (FIG. 9)

The searching operation consists of finding the first active bit in the memory of level 3 while taking account of the current date. The syntax of the search is thus the following:
Res=search()

Figure 8:
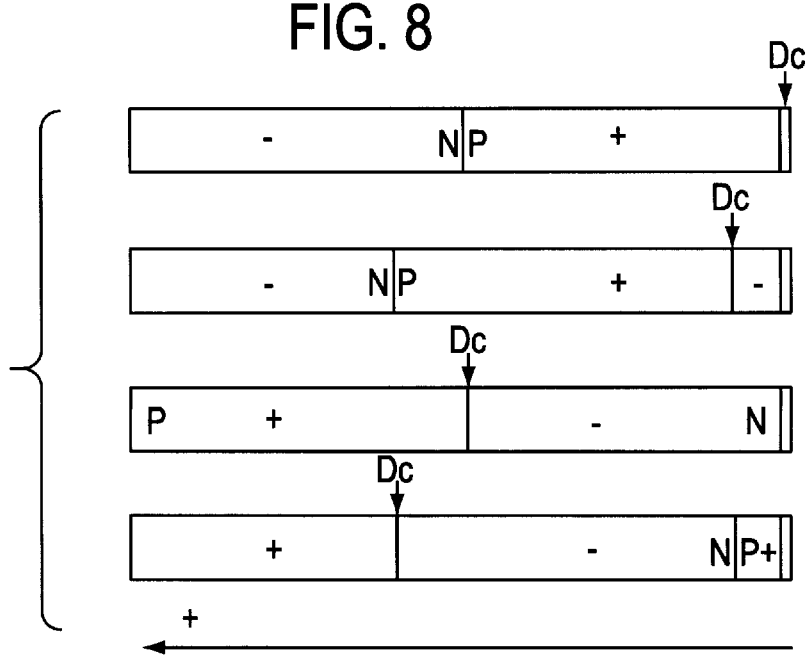
FIG. 8 is a diagram to show past dates and future dates.

The influence of the current date is illustrated by FIG. 8. In this Figure is shown the evolution of the current date in the table of the stop dates or of the memory of level 3 of the tree. There will be observed that the timing axis "t" is oriented from right to left. The positive dates are marked "+" and the negative dates "–". The most positive date is marked "P" and the most negative "N".

One will immediately see that the selection of the first 1 bit in the memory of level 3, going from the most negative date to the most positive date, takes the current date into account. Therefore, the bits have to be rotated to the right to bring the bit that represents the most negative date most to the right. A search for the rightmost active bit is made. This operation may be carried out at each stage of the tree.

This rotation function is carried out by a block BS shown in FIG. 9. This block BS is a device called BARREL SHIFT which is well known from this technology. As this rotation function is very costly because of the number of transistors, it is limited to the level NIV1. However, One should heed that the positive dates do not exceed 7/8 of the "positive" range, which indirectly limits the smallest rate value managed by the device. The bits thus pass "in packets" of 4096/16=256 bits from the negative to the positive domain.
Search sequencing:

The value of the memory of level 1 is read. Each bit represents 256 bits at the level of the leaves of the tree. From a logical point of view, this bit is active ("1") if at least one bit out of the 256 bits is "1".

This word undergoes a rotation "Dn+1=>Dn" to "bring" the negative range the most to the right in the least significant bits. The block BS carries out this operation.

The 4 most significant bits of the current date are added together by an adder ADD1 which has a shift which is equal to "1000" in binary notation (this boils down to inverting the most significant bit!) to yield the number of elementary rotations of a bit carried out by the block BS. (The ratio between sizes of the positive and negative ranges can be modified by adjusting the shift. Here ranges of identical size are chosen.) The block ENCD1 receives the word of 16 bits and selects the active bit from the least significant bits, that is to say, the one representing the smallest date. The result comes in 4 bits and is applied to level NIV2 via an adder ADD2 which adds thereto the result of adder ADD1.

The level NIV2 receives the result from level NIV1 and uses it as an address in its memory. The addressed word is read and sent to a block ENCD2 which again returns the number of the first "1" bit. The result is then concatenated to the preceding least significant bits to be sent to level NIV3.

The level NIV3 carries out a similar operation to the level NIV2. The final result RESULT[11:0] is available on the output of the level NIV3. There too, registers LTH10 to LTH12 are provided to ensure a pipeline operation.

EXAMPLE

To better understand the operation of the tree device 394, the following example will be explained with the aid of FIG. 10.

Let Dc=0101 1001 1111 (=1439 in decimal notation).

This date corresponds to the bit 15 (b15) of the group BLA89.

To this bit corresponds bit b6 of the group of memory MEM1. Past and future dates correspond to bit b6. The future dates correspond to the bits b7 to b12 and the past dates b5 to b0 and b15 to b13. The most positive date thus corresponds to bit b12, the most negative bit to bit b13. Each location of this memory MEM1 corresponds to 256 memory locations of memory MEM3.

The searching phase then unrolls in the following manner.

Block BS gives on the output (0101+1000=1101, that is, 13 shift to the right), that is:
0001 0110 0110 0010.

The block ENCD1 selects the first "1" bit, that is, b1 (0001).

To this code is added the number of shifts made by block BS, so that a first result is obtained:
RES1=1101+0001 (=13+1 in decimal notation)=1110.

It is thus useful analyzing the block BLB14 which has been doubled in the Figure for reasons of readability.

The contents of this group are, for example:
0010 1110 0110 0000.

The block ENCD2 selects the first "1" bit, that is, b5 (0101), whence RES2=0101.
The address 5 is sent to MEM3 and MEM3 evidently gives the address of the group BLA229. This group contains: 0010 1001 0000 0000.

The block ENCD3 selects the first "1" bit, that is, b8 (1000). The final result RESF is thus: 0001 0101 1000 in 12 bits ( RESULT[11:0]).

DESCRIPTION OF THE FUNCTIONS OF THE CALCULATOR 385

As already observed, the calculator 385 contains a table Desc-table by the channel number. This table contains the address of the channel descriptors. The descriptor of the channel is formed by:
the channel identification field (denoted ID)
a field representing the period or jitter on the channel ID (denoted PERIOD)
a pointer to another channel descriptor (denoted NEXT).
The notifications arrive at the calculator in the form of pairs (ID, Th) with the channel identifier ID and the theoretical transmission date Th.
The sine qua non for an ID to leave the spacing device 360 (and thus to be present in the smoothing device 362) is to have its theoretical date passed. For clarity, there will be considered that Th arrives in the form of a period which is equal to the number of cell periods elapsed between the theoretical send date and the moment at which the notification is presented (at the current date Dc). The maximum send date of ID called stop_date calculated by the calculator thus becomes:
stop_date=Dc−Th+Desc_table[ID]→PERIOD
The processing is now described in the form of a pseudo code.

```
start
local variables id.Id.Th
Repeat
        if "new cell period"
        then id = recfunc()
        /*id result of the device*/
        else
                if "arrival of a notification (Id,Th)"
                then
                insfunc(Id,Th)
                endif
        endif
endrepeat
end
recfunc()
local variables el, id, desc.
start
el = Search() /*result of the search of the tree*/
desc = Stop_date_table[el]/*id extraction from the string*/
Stop_date_table[el] = desc → NEXT/*string updated*/
if Stop_date_table[el] == 0/*test string becomes empty*/
then
        ins(el, FALSE, TRUE)/*reset element of the tree*/
endif
id = desc → ID
return id/*result of the device*/
end
Insfunc(id,th)
local variables pid, el, desc
start
desc = desc_table[id]/*descriptor of the ID*/
```

-continued
```
pid = desc → PERIOD/*stop period associated to the ID*/
el = Dc − Th + pid/*calculation of address in the table*/
if Stop_date_table[el] = 0/*test string is empty*/
then
        ins(el, TRUE, FALSE)/*set element in the tree*/
endif
desc → NEXT = Stop_dates_table[el]/*setting in a string*/
Stop_date_table[el] = desc/*included in the string*/
end.
```

It is to be noted that, without departing from the scope of the invention, the communication system according to the invention can be adapted to more sophisticated cell spacings. For example, one may take account of notifications arriving in the queues (elements 201$_i$). With respect thereto, French Patent Application no. 2 721 777 filed under no. 94 07664 could be consulted.

We claim:
1. A communication system formed by:
at least an ATM network which notably transmits information cells from one of its access points to another,
and at least a multiplexing device comprising:
a plurality of access terminals for users who have cells to be transmitted, based on certain requirements, over a certain connection defined by a connection identifier,
at least a connecting terminal for at least an access point of said network for producing in the network a maximum of one cell per cell period,
a plurality of service circuits assigned to the access terminals, formed by:
buffer elements for storing the user cells for a given connection identifier,
a cell transmission control for rendering the stored cells available on cell outputs,
an allocation circuit influencing said transmission control for determining the supply of at least one cell to said connecting terminal, comprising:
a date counter for producing a current date based upon which said production is established,
which system is characterized in that the allocation circuit furthermore comprises:
means for establishing stop dates for each cell to be transmitted which cell is defined by a connection identifier based on said requirements,
a table for storing possibly stringed connection identifiers which depend on an address spacing which is a function of stop dates,
a tree device whose number of leaves corresponds to the address spacing of said table for storing an activation element which determines the presence of the identifier for the whole address spacing of said table,
an insertion circuit for inserting a connection identifier,
a searching circuit for producing the address of the connection identifier(s) by operating the tree device.

* * * * *